(12) United States Patent
Stenton et al.

(10) Patent No.: US 8,169,609 B2
(45) Date of Patent: May 1, 2012

(54) SYSTEM AND METHOD FOR IMPROVING PERFORMANCE OF OPTICAL SYSTEMS WITH TILTED WINDOWS

(75) Inventors: Conrad Stenton, Midland (CA); Gerard Desroches, Penetanguishene (CA)

(73) Assignee: Raytheon Company, Waltham, MA (US)

( * ) Notice: Subject to any disclaimer, the term of this patent is extended or adjusted under 35 U.S.C. 154(b) by 251 days.

(21) Appl. No.: 11/732,682

(22) Filed: Apr. 4, 2007

(65) Prior Publication Data

US 2008/0246872 A1    Oct. 9, 2008

(51) Int. Cl.
  *G01J 3/28* (2006.01)
(52) U.S. Cl. ...................................................... 356/328
(58) Field of Classification Search .................... 356/328
  See application file for complete search history.

(56) References Cited

U.S. PATENT DOCUMENTS

2004/0036027 A1 *  2/2004  Horton et al. ................ 250/372
2004/0156638 A1 *  8/2004  Graves et al. ................ 398/129

\* cited by examiner

*Primary Examiner* — Tarifur Chowdhury
*Assistant Examiner* — Abdullahi Nur
(74) *Attorney, Agent, or Firm* — Christie, Parker & Hale, LLP

(57) ABSTRACT

An optical system with a tilted window. The novel optical system includes a first optical element for receiving an input signal and generating an output signal; a first window adapted to transmit the output signal, the first window being tilted at an angle relative to an axis normal to an optical axis of the system; and a second window adapted to compensate for the first window. In an illustrative embodiment, the first window is an input window of a camera adapted to detect the output signal and is tilted such that reflections from and within the window do not strike detector elements of the camera. In a preferred embodiment, the second window has similar thickness and optical properties as the first window, and is positioned in the optical path of the input signal, tilted at an angle designed to compensate for the first window.

20 Claims, 3 Drawing Sheets

SYSTEM AND METHOD FOR IMPROVING PERFORMANCE OF OPTICAL SYSTEMS WITH TILTED WINDOWS

BACKGROUND OF THE INVENTION

1. Field of the Invention

The present invention relates to optics and optical systems. More specifically, the present invention relates to spectrometers.

2. Description of the Related Art

Optical systems often include a camera or detector for detecting the output of the system. A spectrometer, for example, is an optical instrument for measuring the intensity of light at various wavelengths. The spectrometer uses a diffraction grating or other device that separates the input light into a spectrum of specific wavelengths or spectral bands, which are then detected by a detector, such as a line array camera.

Detectors for such applications are often enclosed in a protective housing to protect the detector elements. A window in the housing allows light to pass through to the detector elements. This window, however, can cause multiple reflection problems in the detector, contaminating the detected output image. These problems can be eliminated by tilting the detector such that reflections from and within the window do not strike the detector elements. However, the addition of a tilted window in the optical path of the convergent output beam can cause the performance of the overall optical system to suffer by, for example, degrading the spot sizes in the output image of a spectrometer.

Hence, a need exists in the art for a system or method for improving the performance of an optical system having tilted window.

SUMMARY OF THE INVENTION

The need in the art is addressed by the optical system of the present invention. The novel optical system includes a first optical element for receiving an input signal and generating an output signal; a first window adapted to transmit the output signal, the first window being tilted at an angle relative to an axis normal to an optical axis of the system; and a second window adapted to compensate for the first window. In an illustrative embodiment, the first window is an input window of a camera adapted to detect the output signal and is tilted such that reflections from and within the window do not strike detector elements of the camera. In a preferred embodiment, the second window has similar thickness and optical properties as the first window, and is positioned in the optical path of the input signal, tilted at an angle designed to compensate for the first window.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The teachings of the present invention will now be discussed with reference to a specific example of a Littrow-mounted grating spectrometer. The invention, however, may be applied to other spectrometer configurations and other optical systems without departing from the scope of the present teachings.

Figure 1:
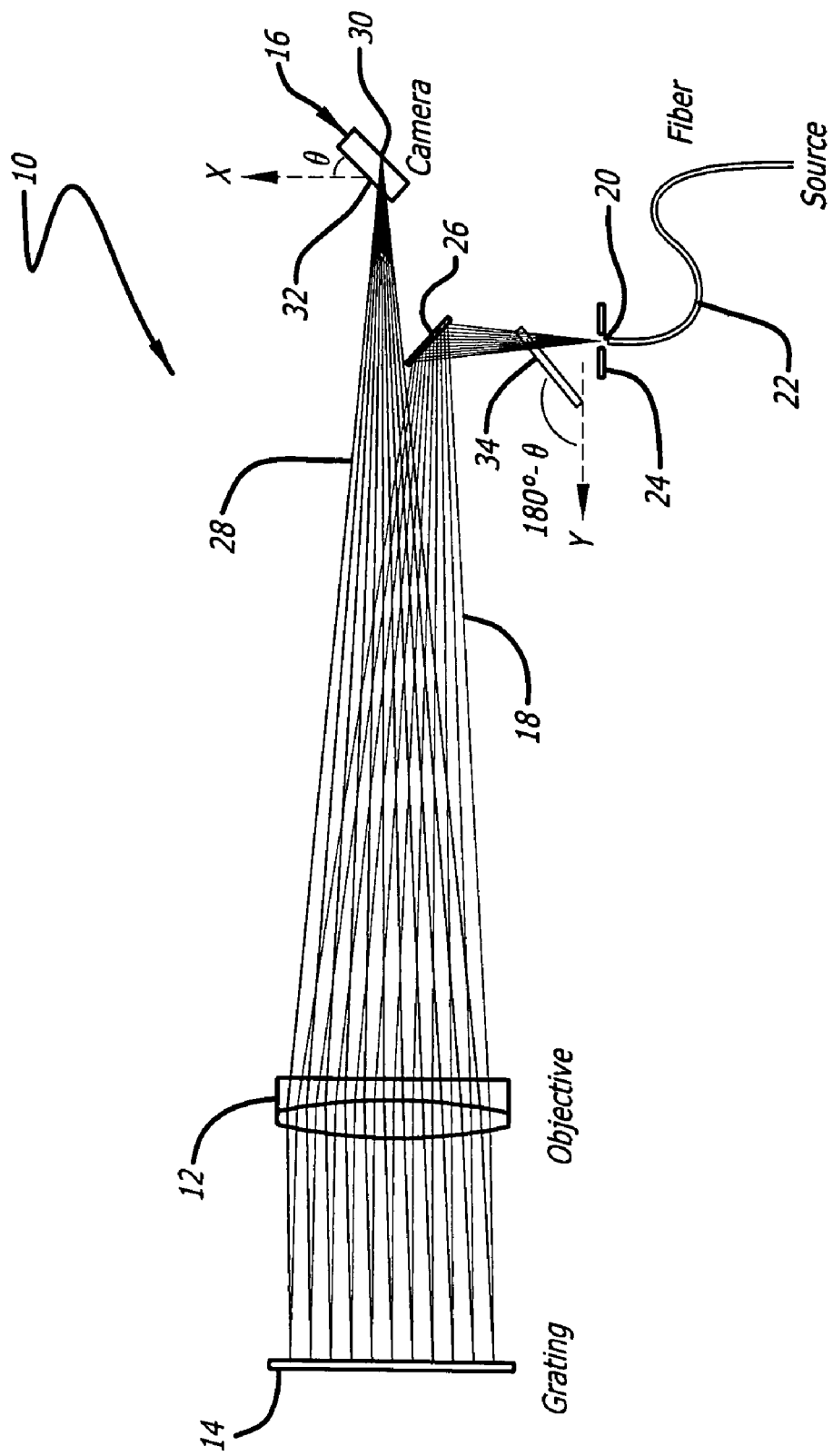
FIG. 1 is an optical schematic of a spectrometer designed in accordance with an illustrative embodiment of the present teachings.

FIG. 1 is an optical schematic of a spectrometer 10 designed in accordance with an illustrative embodiment of the present teachings. The spectrometer 10 includes an objective lens 12, a reflective diffraction grating 14, and a line array camera 16. In the illustrative embodiment, the optical system 10 is arranged in a Littrow-mounted configuration in which the incoming beam 18 and outgoing beam 28 both use the same lens 12.

Light 18 from an input point source 20 is collimated by the lens 12 and reflected by the grating 14 back toward the lens 12. In the illustrative embodiment, the input point source 20 is provided by an optical fiber 22, the output of which is passed through an entrance aperture or slit 24. A fold mirror 26 directs the input signal toward the lens 12.

The reflective grating 14 acts as a mirror and a grating in this configuration, producing reflection in one plane and refraction in the other. That is, the point source becomes a line that is a function of the gratings' dispersion characteristics. The line image 28 produced by the grating 14 is focused by the lens 12 onto the detector elements 30 of the camera 16.

The camera 16 includes a line array of detector elements 30 enclosed in a protective housing with a window 32 for allowing light 28 to pass through to the detector elements 30. The camera 16 is tilted such that reflections from and within the window 32 do not strike the line array 30 of the camera 16. As shown in FIG. 1, the window 32 is tilted by an angle θ relative to an axis x normal to the optical axis. As an example, the window 32 may be tilted by an angle θ of 20°.

Figure 2:
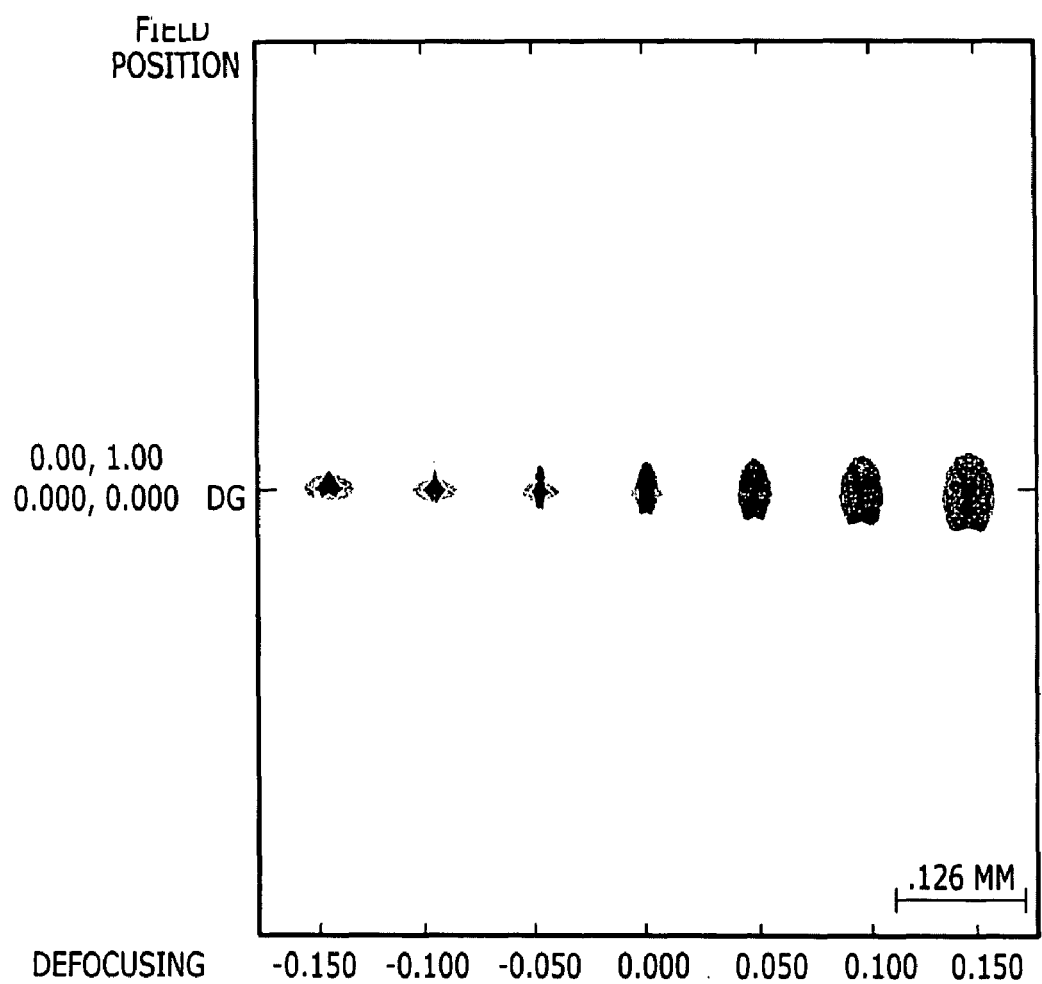
FIG. 2 is an example output image from a conventional spectrometer with a tilted detector window.

The addition of the camera window 32 into the optical path of the system 10 introduces a non-symmetrical element that can degrade the spot sizes of the output image. FIG. 2 is an example output image from a conventional spectrometer with a tilted camera window. As shown in the figure, the tilted window degrades the output image, resulting in irregular spot sizes and shapes.

In accordance with the present teachings, adding a second window 34 to compensate for the camera window 32 can yield significant improvement on spot size and uniformity. Returning to FIG. 1, the spectrometer 10 also includes a second window 34 adapted to compensate for the camera window 32. The compensator window 34 has the same thickness and optical properties as the camera window 32. In the preferred embodiment, the compensator window 34 is placed in front of the source 20, in the optical path of the input beam 18. Alternatively, the compensator window 34 may be placed in the optical path of the output beam 28, in front of the camera window 32. However, studies have shown that placing the compensator window 34 in the object side (in front of the source 20) should yield improved performance over placing the window 34 in the image side (in front of the camera 16). The compensator window 34 can be placed anywhere in the input beam 18, provided that it does not interfere with the reflected beam 28. In the illustrative embodiment, the compensator window 34 is positioned close to the source 20 to allow for a smaller sized window.

The compensator window 34 is tilted at an appropriate angle designed to compensate for the camera window 32. In the illustrative embodiment, the window 34 is tilted at an angle supplementary to that of the camera window 32. As shown in FIG. 1, the window 34 is tilted by an angle 180°-θ relative to an axis y normal to the optical axis. For best performance, the compensator window 34 should be identical to the camera window 32, fabricated from the same material (typically glass) and having the same thickness and optical properties (e.g. refractive index).

In operation, the compensator window 34 pre-aberrates the input beam 18, such that when the beam 28 passes through the camera window 32, the camera window 32 effectively removes the aberration produced by the compensator window 34. Thus, adding a simple window 34 cures the problems caused by the camera window 32.

Figure 3:
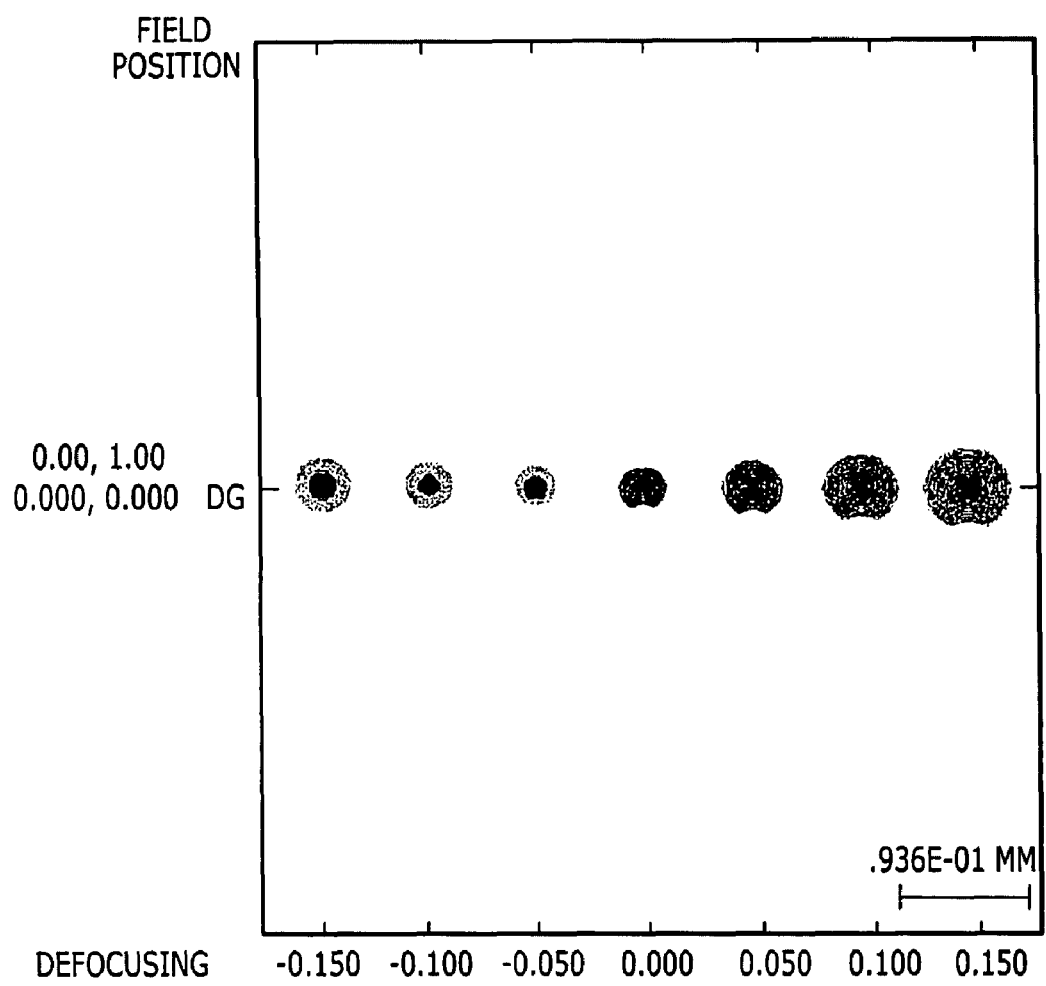
FIG. 3 is an example output image from a spectrometer designed in accordance with an illustrative embodiment of the present teachings.

FIG. 3 is an example output image from a spectrometer with a compensator window designed in accordance with an illustrative embodiment of the present teachings. As shown in the figure, the addition of a compensator window improves spectrometer performance, producing spots that are much more circular and also smaller (more focused). The RMS (root-mean-square) spot sizes in the example of FIG. 3 (with a compensator window) are 21.0 μm, 16.3 μm, 14.4 μm, 16.5 μm, 21.4 μm, 27.6 μm, and 34.5 μm. In comparison, the RMS spot sizes in the example of FIG. 2 (without a compensator window) are 23.7 μm, 20.9 μm, 20.7 μm, 23.2 μm, 27.7 μm, 33.4 μm, and 39.7 μm.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. An optical system comprising: first means for receiving an input signal and outputting an output signal along an optical axis; a first window for passing said output signal, wherein said window includes a planar input surface and said window is tilted such that an axis normal to said input surface is at a non-zero angle relative to said optical axis; and second means for compensating for an effect of said tilt of said first window on said output signal, wherein said second means includes a second window, wherein said second window is optically transmissive element and thickness matching and similar optical properties as that of said first window.

2. The invention of claim 1 wherein said second window is adapted to pre-aberrate said input or output signal such that said first window removes aberrations in said output signal generated by said second window.

3. The invention of claim 1 wherein said second window includes a planar input surface and said second window is tilted such that an axis normal to said input surface of said second window is at an angle relative to an optical axis of said input or output signal adapted to compensate for said first window.

4. The invention of claim 3 wherein said second window is tilted at an angle supplementary to the tilt angle of said first window.

5. The invention of claim 1 wherein said second window is made from a material matching that of said first window.

6. The invention of claim 1 wherein said second window is positioned in an optical path of said input signal.

7. The invention of claim 1 wherein said second window is positioned in an optical path of said output signal, in front of said first window.

8. The invention of claim 1 wherein said system further includes third means for detecting said output signal.

9. The invention of claim 8 wherein said third means includes a camera.

10. The invention of claim 9 wherein said camera includes one or more detector elements positioned behind said first window.

11. The invention of claim 10 wherein said first window is tilted such that reflections from and within said window do not strike said detector elements.

12. The invention of claim 10 wherein said first window is part of said camera.

13. The invention of claim 10 wherein said first means includes a diffraction grating.

14. The invention of claim 13 wherein said system further includes a lens adapted to collimate said input signal.

15. The invention of claim 14 wherein said lens is also adapted to focus said output signal from said diffraction grating onto said detector elements of said camera.

16. The invention of claim 8 wherein said third means includes a detector disposed within a housing, and said first window is a window in said housing for allowing light to pass through to said detector.

17. The invention of claim 1 wherein said optical system is a spectrometer.

18. An optical system comprising:
a first optical element adapted to receive an input signal and output an output signal along an optical axis;
a camera for detecting said output signal, said camera including a housing having an input window for transmitting said output signal through said housing, wherein said input window includes a planar input surface and said window is tilted such that an axis normal to said input surface is at a non-zero angle relative to said optical axis; and
a second window having similar thickness and optical properties as said input window positioned in an optical path of said input or output signal, wherein said second window includes a planar input surface and said window is tilted such that an axis normal to said input surface of said second window is at an angle relative to an optical axis of said input or output signal adapted to compensate for an effect of said tilt of said input window on said output signal.

19. A spectrometer comprising:
an input aperture for receiving an input signal;
a lens for collimating said input signal;
a diffraction grating adapted to diffract collimated light from said lens to produce an output signal that is output toward said lens along an optical axis;
a camera adapted to receive and detect said output signal from said lens, said camera including one or more detector elements disposed within a housing, wherein said housing includes an input window for transmitting said output signal through said housing to said detector elements, and said input window includes a planar input surface and said window is tilted such that an axis normal to said input surface is at a non-zero angle relative to said optical axis such that reflections from and within said input window do not strike detector elements of said camera; and a second window having similar thickness and optical properties as said input window positioned in an optical path of said input signal between said input aperture and said lens, wherein said second window includes a planar input surface and said window is tilted such that an axis normal to said input surface of said second window is at an angle relative to an optical axis of said input signal adapted to compensate for an effect of said tilt of said input window on said output signal.

20. A method for improving performance in an optical system including a camera with an input window for transmitting a signal through a housing of said camera, said method including the steps of:

tilting said camera such that that an axis normal to an input surface of said input window is at a non-zero angle relative to an optical axis of said system and reflections from and within said input window do not strike detector elements of said camera;

positioning a second window having similar thickness and optical properties as said input window in an optical path of said system; and tilting said second window such that an axis normal to an input surface of said second window is at an angle relative to an optical axis of said input or output signal adapted to compensate for an effect of said tilt of said input window on said signal.

\* \* \* \* \*